US012794178B2

(12) United States Patent
Bae et al.

(10) Patent No.: US 12,794,178 B2

(45) Date of Patent: Nov. 10, 2026

(54) CONNECTOR ASSEMBLY

(71) Applicant: KUM LLC, Ulsan (CH)

(72) Inventors: Sang Ho Bae, Ulsan (KR); Dong Hoon Lee, Ulsan (KR); Young Joo Yun, Ulsan (KR); Jin Su Choi, Ulsan (KR); Venkatesan Mahalingam, Tamilnadu (IN)

(73) Assignee: KUM LLC, Ulsan (KR)

( * ) Notice: Subject to any disclaimer, the term of this patent is extended or adjusted under 35 U.S.C. 154(b) by 383 days.

(21) Appl. No.: 18/633,986

(22) Filed: Apr. 12, 2024

(65) Prior Publication Data

US 2024/0347969 A1 Oct. 17, 2024

(30) Foreign Application Priority Data

Apr. 14, 2023 (KR) ........................ 10-2023-0049590

(51) Int. Cl.

*H01R 13/62* (2006.01)
*H01R 13/50* (2006.01)
*H01R 13/629* (2006.01)

(52) U.S. Cl.

CPC ....... *H01R 13/62977* (2013.01); *H01R 13/50* (2013.01); *H01R 13/62905* (2013.01)

(58) Field of Classification Search

CPC .............................. H01R 13/50; H01R 13/629
See application file for complete search history.

(56) References Cited

U.S. PATENT DOCUMENTS

| | | | | |
|---|---|---|---|---|
| 4,775,327 | A | 10/1988 | Normann et al. | |
| 6,761,568 | B2 | 7/2004 | Bakker et al. | |
| 8,038,455 | B1 | 10/2011 | Moraes et al. | |
| 2004/0259401 | A1 * | 12/2004 | Wu ........................ | G06K 13/08 439/159 |

FOREIGN PATENT DOCUMENTS

| | | | |
|---|---|---|---|
| KR | 101342165 | B1 | 12/2013 |

OTHER PUBLICATIONS

Extended European Search Report for EP Application No. 24170026.9; mailed Sep. 18, 2024; 7 pages.

* cited by examiner

*Primary Examiner* — Neil Abrams
(74) *Attorney, Agent, or Firm* — Billion & Armitage

(57) ABSTRACT

A connector assembly having a moving plate to protect terminals and maintain alignment within a first connector is provided. The connector assembly includes a first connector having a coupling space formed therein and having a plurality of first terminals disposed in the coupling space, a moving plate movably installed in the coupling space and having a terminal hole through which the first terminal passes, and a second connector coupled to one side of the first connector and having a holder moving the moving plate in the coupling space. A cam groove is formed in an external surface of the moving plate. A moving pin, insertable and movable in the cam groove, is formed on the holder, and when the moving plate and the holder are coupled, the moving plate moves in a direction, perpendicular to a coupling direction.

10 Claims, 6 Drawing Sheets

CONNECTOR ASSEMBLY

CROSS-REFERENCE TO RELATED APPLICATION(S)

This application claims benefit of priority to Korean Patent Application No. 10-2023-0049590 filed on Apr. 14, 2023 in the Korean Intellectual Property Office, the disclosure of which is incorporated herein by reference in its entirety.

TECHNICAL FIELD

The present disclosure relates to a connector assembly having a moving plate protecting terminals and maintaining alignment within a first connector.

BACKGROUND

Generally, a connector is a connection device electrically connecting a power source to a device, a device to a device, and internal units of a device. For example, a first connector and a second connector may be formed to be coupled to each other to form a connector assembly. A plurality of terminals for transmitting current and signals may be provided and aligned inside the first connector and the second connector.

As the performance of devices improves and functions thereof increase, the current and signals transmitted through the connector may increase, and as a result, the number of terminals provided in the connector may also increase. Accordingly, the terminal may be reduced in thickness and may be relatively long, and as the terminal becomes thinner and longer, there is a risk that the terminal may be damaged during the coupling process.

To prevent this problem, a moving plate may be installed inside the connector to perform functions such as protecting terminals, maintaining alignment, and preventing the inflow of foreign substances before coupling.

However, by adding such a moving plate, a series of interlocking structures or parts related to the operation of a moving plate are additionally required for the connector or connector assembly, and thus, the configuration of the connector assembly inevitably becomes complicated.

Moreover, for example, in the case in which the moving plate is temporarily coupled to the first connector, the temporary coupling state of the moving plate may be easily damaged by unwanted external force applied to the first connector, and ultimately the moving plate cannot reliably protect and maintain the terminal.

SUMMARY

An aspect of the present disclosure is to provide a connector assembly that may be simply constructed without separate parts and in which a moving plate may be reliably maintained in a temporary coupling position when unwanted external force is applied.

According to an aspect of the present disclosure, a connector assembly may include a first connector having a coupling space formed therein and having a plurality of first terminals disposed in the coupling space; a moving plate movably installed in the coupling space and having a terminal hole through which the first terminal passes; and a second connector coupled to one side of the first connector and having a holder moving the moving plate in the coupling space. A cam groove may be formed in an external surface of the moving plate. A moving pin, insertable and movable in the cam groove, may be formed on the holder, and when the moving plate and the holder are coupled, the moving plate may move in a direction, perpendicular to a coupling direction.

The first connector may include a first housing, the first housing may have the coupling space therein, the first housing may include a locking portion formed to protrude into the coupling space, and a hook may be formed to protrude to one side of the moving plate on the external surface of the moving plate, such that the hook may be caught by and fixed to the locking portion.

The first housing may have at least one first stopper protruding into the coupling space, and the external surface of the moving plate may be provided with at least one second stopper positioned to correspond to the first stopper.

When the moving plate and the holder are coupled to each other, the moving plate may move in a direction, perpendicular to the coupling direction, by the holder, and thus blocking by the first stopper and the second stopper may be released, and as the holder contacts the moving plate to drive the moving plate, the moving plate may be moved from a temporary coupling position to a fully coupled position.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
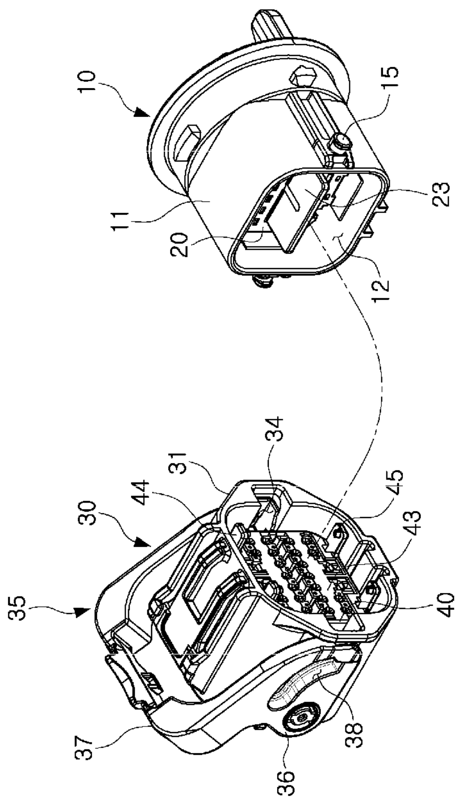
FIG. 1 is a perspective view illustrating separated first and second connectors of a connector assembly according to an embodiment.

Hereinafter, the present disclosure will be described in detail through illustrative drawings. When adding reference numerals to components in respective drawings, it should be noted that the same components are given the same reference numerals as much as possible even if they are illustrated in different drawings.

Figure 2:
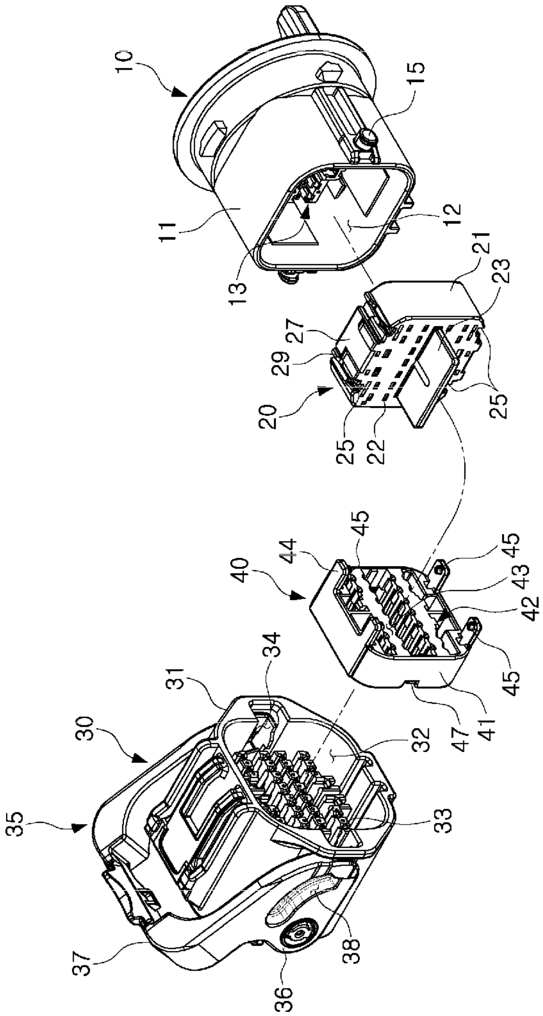
FIG. 2 is an exploded perspective view of FIG. 1.
Figure 3:
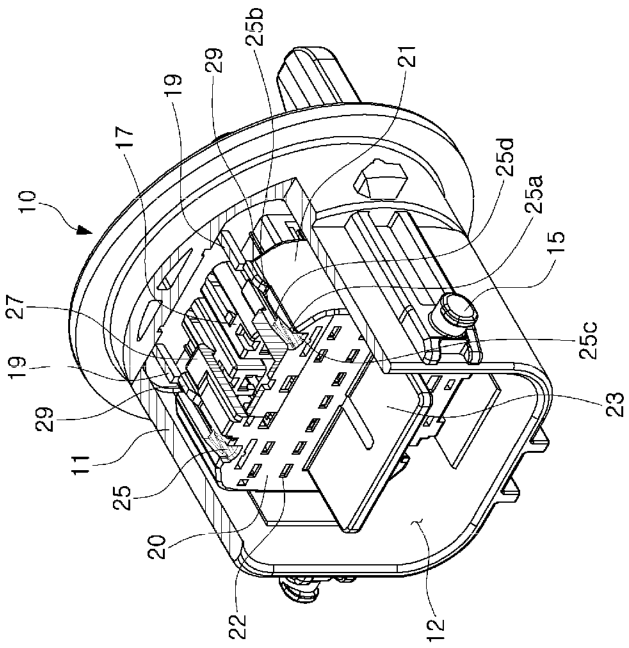
FIG. 3 is a partially cut-away perspective view illustrating a moving plate in a temporary coupling position within a first connector.

FIG. 1 is a perspective view illustrating separated first and second connectors of a connector assembly according to an embodiment, and FIG. 2 is an exploded perspective view of FIG. 1. FIG. 3 is a partially cut-away perspective view illustrating a moving plate in a temporary coupling position within the first connector.

The connector assembly according to an embodiment may include a first connector 10, a moving plate 20, a second connector 30, and a holder 40.

The first connector 10 forms the exterior and framework of a first housing 11. The first housing may be formed of an insulating material and may be formed as a substantially cylindrical member with one side open and the other side closed. Accordingly, a coupling space 12 may be formed inside the first connector, for example, inside the first housing.

The holder 40 constituting the second connector 30 may be at least partially inserted into the coupling space 12. Additionally, within the coupling space, a plurality of first terminals (not illustrated) of the first connector 10 may protrude and be disposed at predetermined intervals. The first terminal may be partially located in a terminal seating portion 13 formed by penetrating through the closed surface of the first housing 11, and may be installed such that the end thereof may protrude into the coupling space.

The coupling space 12 is defined by the inner surface and closed surface of the first housing 11, and guide protrusions 15 may be formed on the outer surfaces of facing side walls of the first housing, respectively.

Additionally, a locking portion 17 may be formed in a substantially plate shape on the closed surface of the first housing 11 and protrude into the coupling space 12. The locking portion serves to restrict the moving plate from coming out of the first connector 10, for example, the first housing, by locking a hook 27 of the moving plate 20 thereto. In detail, the locking portion prevents the moving plate from coming out of the first housing at the temporary coupling position.

At least one first stopper 19 may be formed in a substantially pin shape on the closed surface and inner surface of the first housing 11 and may protrude into the coupling space 12 from the closed surface and inner surface. The first stopper serves to restrict the insertion of the moving plate 20 deep into the first connector 10, for example, the first housing, by external forces other than the force exerted by the second connector 30. In detail, the first stopper prevents the moving plate from moving from the temporary coupling position toward the closed surface of the first housing due to other unwanted external forces.

The moving plate 20 may be formed as a substantially quadrangular plate member with a predetermined thickness. The moving plate may be formed to have a shape corresponding to a cross-sectional shape of the coupling space 12 within the first housing 11. For example, the moving plate may have a plurality of outer surfaces 21 formed along edges thereof.

A plurality of terminal holes 22 may be drilled in the moving plate 20. Respective terminal holes may be formed in positions respectively corresponding to a plurality of first terminals of the first connector 10.

In the moving plate 20, the hook 27 having a substantially plate shape may be formed in a cantilever shape capable of elastic deformation, on one of the plurality of outer surfaces 21. The hook may be formed to protrude to one side of the moving plate, for example, toward the closed surface of the first housing 11.

The hook 27 may be fixed to the locking portion 17 of the first housing 11. Thereby, the moving plate 20 may be restricted from coming out of the first connector 10, for example, the first housing, in the temporary coupling position.

A guide protrusion plate 23 may be formed to protrude on the other side of the moving plate 20. The guide protrusion plate may be positioned approximately at right angles to the moving plate and may have an overall quadrangular plate shape.

The moving plate 20 is located within the coupling space 12 of the first connector 10, serves to maintain the gap between the plurality of first terminals, and prevents deformation of the first terminals due to external force. In detail, the moving plate may move between the temporary coupling position and the fully coupled position within the coupling space of the first connector when the first connector 10 and the second connector 30 are coupled or separated.

In this case, the temporary coupling position is a position in which the moving plate 20 is adjacent to the end of the first terminal. The fully coupled position is a position in which the first connector 10 and the second connector 30 are completely coupled and the moving plate is in contact with the closed surface of the coupling space 12, or the position in which the moving plate is closest to the closed surface.

In the connector assembly according to an embodiment, at least one cam groove 25 extending in the coupling direction of the moving plate may be formed in at least one of the plurality of outer surfaces 21 of the moving plate 20. The cam groove may extend from one edge of the moving plate to the other edge thereof.

The cam groove 25 may include an inclined portion 25*a* that extends to be at least partially inclined at a predetermined angle with respect to the coupling direction, or an arc-shaped portion curved and extended with a predetermined curvature. The inclined portions are illustrated in the drawings.

Additionally, the cam groove 25 may include a straight portion 25*b* extending from the end of the inclined portion 25*a* or the arc-shaped portion to one edge of the moving plate 20. Both ends of the cam groove may be formed to be open to both sides of the moving plate.

Optionally, the cam home 25 may further include an inclined surface 25*c* which is adjacent to the other edge of the moving plate 20 and of which a groove depth changes within the inclined portion 25*a* or the arc-shaped portion, and a stopping end 25*d* formed at an upper end of the inclined surface.

As a result, moving pins 45 of the holder 40 constituting the second connector 30 may be inserted into the cam grooves 25, and move up the inclined surface 25*c*, to be biased along the inclined portion 25*a* or the arc-shaped portion, and then be locked on the stopping end 25*d*.

On at least one outer surface on which the cam groove 25 is formed among the plurality of outer surfaces 21 of the moving plate 20, at least one second stopper 29 may be formed in contact with the cam groove and be positioned to correspond to the first stopper 19 formed on the closed surface and inner surface of the first housing 11.

Accordingly, when the first stopper 19 and the second stopper 29 meet and contact each other at the temporary coupling position of the moving plate 20, the moving plate may not be inserted deeply into the first connector 10, for example, the first housing 11. At this time, if an external force other than the force caused by the second connector 30, for example, an unwanted external force is applied to the moving plate, the moving plate remains in the temporary coupling position in the first connector and cannot be moved due to the corresponding contact of the stoppers on both sides.

However, when the moving plate 20 is moved in a direction perpendicular to the coupling direction by the second connector 30, the first stopper 19 and the second stopper 29 are misaligned and pass sideways without meeting each other, and thus the moving plate may be moved from the temporary coupling position towards the closed surface of the first housing 11.

When the moving plate 20 is moved in a direction perpendicular to the coupling direction, the first stopper 19 deviated from the second stopper 29 may be at least partially inserted into the straight portion 25*b* of the cam groove 25 or positioned to correspond to the straight portion.

In the connector assembly according to an embodiment, when the moving plate 20 is placed in the temporary coupling position within the first connector 10, as illustrated in FIG. 3, the second stopper 29 of the moving plate contacts the first stopper 19 of the first connector correspondingly and also, the hook 27 of the moving plate is locked to the locking portion 17 of the first connector, and therefore, the moving plate cannot be moved relative to the first connector in either direction.

Therefore, in the connector assembly according to an embodiment, when an unwanted external force is applied to the moving plate 20, the moving plate has the advantage of being reliably maintained in the temporary coupling position.

The second connector 30 may be coupled to one side of the first connector 10, for example, to the open surface of the first housing 11.

The second connector 30 may include a second housing 31 with an accommodating space 32 formed therein, a plurality of second terminals (not illustrated) inserted into one side of the second housing, and a holder 40 inserted into the other side of the second housing and coupled to the second housing within the accommodating space.

The second housing 31 forms the exterior and framework of the second connector 30. The second housing may be formed of an insulating material and may be formed as a substantially cylindrical member with one side open and the other side closed. Accordingly, the accommodating space 32 may be formed inside the second connector, for example, inside the second housing.

In the accommodating space 32, the holder 40 constituting the second connector 30 may be inserted and coupled. Additionally, a terminal accommodating portion 33 for installing a plurality of second terminals of the second connector is provided in the accommodating space, and a plurality of second terminals may be disposed at predetermined intervals in the terminal accommodating portion.

Additionally, a lever 35 may be installed on the outside of the second housing 31. The lever serves as a lever when coupling or separating the first connector 10 and the second connector 30, allowing the first connector and the second connector to be coupled or separated with relatively small force.

The lever 35 may be configured by a handle 37 connecting interlocking plates 36 that are rotatably installed on the outer surface of the second housing 31 and provided to face each other. An interlocking channel 38 may be formed on both interlocking plates, and the guide protrusion 15 of the first housing 11 is located in the interlocking channel so that it may move relative to the interlocking channel. One end of the interlocking channel may be opened to allow entry of the guide protrusion.

Additionally, a guide slit 34 for insertion and movement of the guide protrusion 15 may be formed in the outer surface of the second housing 31 with a predetermined length. The guide slit of the second housing and the interlocking channel 38 of the lever 35 may intersect and communicate with each other.

For example, the guide protrusion 15 of the first housing 11 is inserted into the guide slit 34 of the second housing 31, and then moves a certain distance within the guide slit and enters the interlocking channel 38 of the lever 35. In this state, the guide protrusion may be moved within the guide slit along the trajectory of the interlocking channel when the lever, for example, the interlocking plate 36, is rotated in the first direction (for example, clockwise in FIG. 1).

Accordingly, as the second connector 30 is pulled toward the first connector 10, the first connector and the second connector may be coupled.

On the other hand, when the lever 35, for example, the interlocking plate 36, is rotated in the second direction (for example, counterclockwise in FIG. 1), the guide protrusion 15 may be moved in the opposite direction to before, within the guide slit 34 along the trajectory of the interlocking channel 38.

Accordingly, the coupling between the first connector 10 and the second connector 30 is released, and the first connector and the second connector may be separated.

The holder 40 may be formed as a substantially quadrangular plate member with a predetermined thickness. The holder may be formed to have a shape corresponding to the cross-sectional shape of the accommodating space 32 in the second housing 31. For example, the holder may have a plurality of outer surfaces 41 formed along edges thereof.

Among the plurality of outer surfaces 41 of the holder 40, fastening grooves 47 may be formed on outer surfaces opposing each other, and by press-fitting or locking the fastening groove with a fastening protrusion (not illustrated) provided in the second housing 31, the holder may be seated inside the second housing.

A plurality of terminal holes 42 may be drilled in the holder 40. Respective terminal holes may be formed in positions corresponding to a plurality of second terminals of the second connector 30, respectively.

The holder 40 may be formed to have a shape and size corresponding to the moving plate 20. On one side of the holder that is in contact with the moving plate, a guide insertion hole 43 may be formed for insertion of the guide protrusion plate 23 of the moving plate.

In this case, the terminal accommodating portion 33 of the second connector 30 may be inserted between the guide protrusion plate 23 of the moving plate 20 and the guide insertion hole 43 of the holder 40. Accordingly, the guide insertion hole of the holder may function as a terminal hole.

In the connector assembly according to an embodiment, an insertion portion 44 extending from one side of the holder 40 in the coupling direction may be formed. The insertion portion may have an approximate plate shape and may be formed integrally with the holder.

Furthermore, the moving pin 45 may be formed on the free end of the insertion portion 44 while protruding at approximately a right angle from the surface of the free end, to be inserted and moved within the cam groove 25 of the moving plate 20. The end of the moving pin may have at least a partially curved surface, so that if the cam groove has an inclined surface 25*c*, the moving pin may move up the inclined surface smoothly.

The holder 40 configured and disposed in this manner supports and fixes the second terminal installed in the second housing 31, and may serve to reinforce the coupling between the second housing and the second terminal and prevent the second terminal from being separated from the second housing.

In addition, the holder 40 coupled to the inside of the second housing 31 may be inserted into the coupling space 12 of the first housing 11 when the first connector 10 and the second connector 30 are coupled. Thereby, the holder may be interposed between the first housing and the second housing. At this time, the open end of the first housing may be inserted between the inner surface of the second housing and the outer surface 41 of the holder.

As the first connector 10 is inserted into the second connector 30, the guide protrusion plate 23 of the moving plate 20 penetrates the holder 40, and as the insertion portion 44 of the holder is inserted between the inner surface of the first housing 11 and the outer surface 21 of the moving plate, the moving pin 45 on the free end of the insertion portion may be inserted into the cam groove 25 of the moving plate and positioned to move along the cam groove.

In addition, as the insertion portion 44 of the holder 40 is inserted between the inner surface of the first housing 11 and the outer surface 21 of the moving plate 20, the coupling between the holder and the first connector 10, in detail, between the holder and the first housing and between the holder and the moving plate, may be stably obtained.

Moreover, the holder 40 may be driven so that the moving plate 20 moves between the temporary coupling position and the fully coupled position within the coupling space 12 of the first housing 11, when coupling and separating the first connector 10 and the second connector 30. The driving force therefor may be transmitted from the force that rotates the lever 35.

Therefore, the connector assembly according to an embodiment has an advantage of being simply constructed without separate parts for operating the moving plate 20.

Below, the operation of the connector assembly according to an embodiment, in detail, the process of coupling and separating, will be described.

FIGS. 4A to 6B are diagrams illustrating the process in which the moving plate 20 is moved from the temporary coupling position to the fully coupled position when coupling the first connector 10 and the second connector 30 of the connector assembly according to an embodiment.

First, the state illustrated in FIG. 4 is a state in which the lever 35 is tilted and the first connector 10 and the second connector 30 are not electrically connected. Additionally, this state is simply a state in which the first connector is inserted into the second connector, and the moving plate 20 is held in the temporary coupling position within the first housing 11.

Figure 4B:
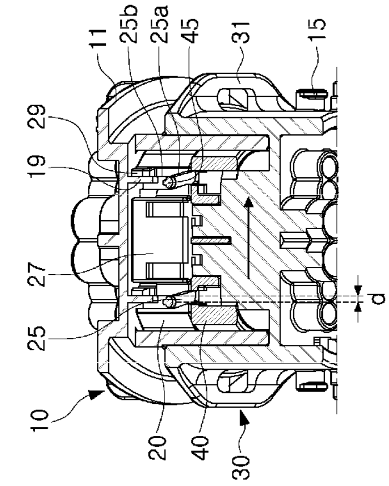
FIGS. 4A to 6B are diagrams illustrating a process in which a moving plate is moved from a temporary coupling position to a fully coupled position when coupling a first connector and a second connector of a connector assembly according to an embodiment.
Figure 4A:
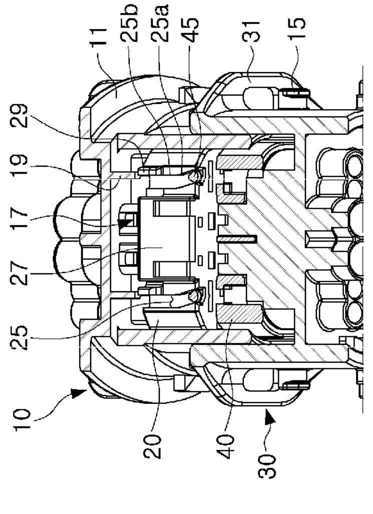

In FIG. 4A, it may be seen that the hook 27 of the moving plate 20 is caught by and fixed to the locking portion 17 of the first connector 10. At this time, as illustrated in plan view in FIG. 4B, the hook 27 is positioned biased toward one side (for example, the left side in the drawing) of the locking portion 17.

Figure 5B:
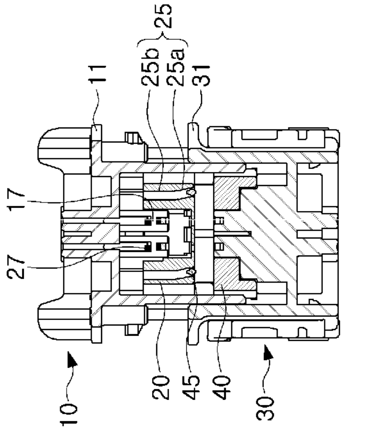
Figure 5A:
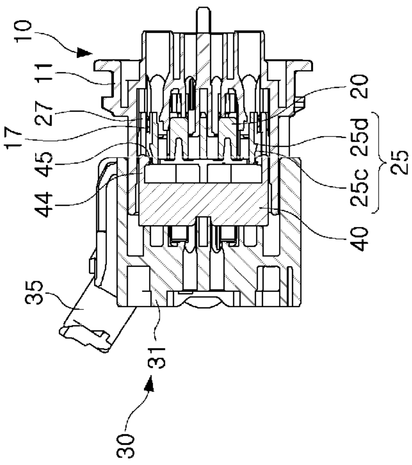

In addition, as illustrated in FIG. 5A, it may be seen that the second stopper 29 of the moving plate 20 is in corresponding contact with the first stopper 19 of the first connector 10.

Accordingly, the moving plate 20 cannot move relative to the first connector 10 due to unwanted external force.

In this state, when the first connector 10 is further inserted into the second connector 30 by a certain distance, the guide protrusion plate 23 of the moving plate 20 may penetrate through the holder 40 of the second connector through the guide insertion hole 43, and as the insertion portion 44 of the holder is inserted between the inner surface of the first housing 11 and the outer surface 21 of the moving plate, the moving pin 45 on the free end of the insertion portion may be positioned to be inserted into the cam groove 25 of the moving plate and to move along the cam groove.

For example, when the lever 35 is rotated in the first direction, the guide protrusion 15 of the first housing 11 may be moved within the guide slit 34 of the second housing 31 along the trajectory of the interlocking channel 38 in the interlocking plate 36 of the lever.

According to this relative movement, the first connector 10 and the second connector 30 are pulled toward each other and the first connector and the second connector may be coupled.

When the first connector 10 and the second connector 30 are pulled toward each other, the holder 40 in the second housing 31 may come into contact with the moving plate 20, and the moving pin 45 of the holder may move along the inclined portion 25*a* or the arc-shaped portion while moving up the inclined surface 25*c* within the cam groove 25 of the moving plate and may then be locked on the stopping end 25*d*.

Simultaneously therewith, as the moving pin 45 moves along the inclined portion 25*a* or the arc-shaped portion of the cam groove 25, the moving plate 20 moves relative to the holder 40 in a direction perpendicular to the coupling direction as illustrated in FIG. 5B, and this relative movement causes the moving plate to move relative to the first connector 10 in the same direction.

For example, a moving distance d of the moving plate 20 with respect to the holder 40 may range approximately from 0.5 to 1 mm, but is not necessarily limited thereto.

In this manner, the moving plate 20 is moved in a direction perpendicular to the coupling direction by the holder 40 constituting the second connector 30, and as the first stopper 19 and the second stopper 29 are misaligned and pass sideways without meeting each other, blocking by both stoppers may be released.

Therefore, the moving plate 20 may be allowed to move from the temporary coupling position towards the closed surface of the first housing 11.

Accordingly, the moving plate 20 equipped with the cam groove 25 may be selectively moved only by the force applied by the holder 40 equipped with the moving pin 45.

As illustrated in FIG. 6, when the lever 35 is fully rotated and erected, the first connector 10 and the second connector 30 are completely coupled to obtain electrical connection.

Additionally, in this state, the holder 40 pushes the moving plate 20 toward the closed surface within the coupling space 12 of the first housing 11, and thus, the moving plate is moved to the fully coupled position within the first housing.

Figure 6B:
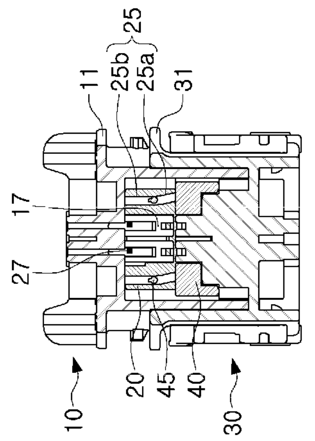
Figure 6A:
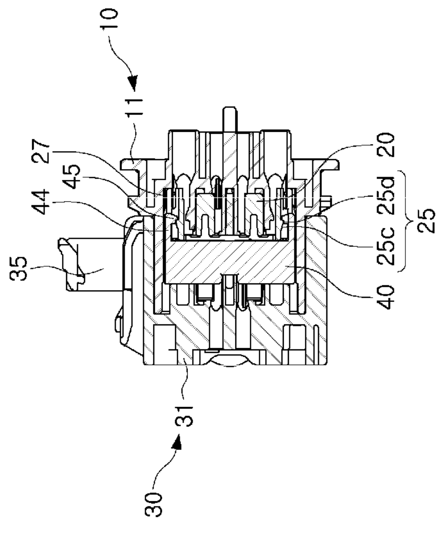

In FIG. 6A, it may be seen that the moving plate 20 is deeply inserted into the closed surface within the first housing 11. At this time, as illustrated in plan view in FIG. 6B, the hook 27 is positioned biased from the locking portion 17 to the other side (for example, the right side in the drawing).

In the connector assembly according to an embodiment, the separation process of separating the first connector and the second connector and moving the moving plate from the fully coupled position to the temporary coupling position may be performed in the reverse order and reverse direction of the above-described process.

As discussed above, according to embodiments of the present disclosure, the connector assembly may be simply constructed without separate parts for operating the moving plate, and when an unwanted external force is applied, the moving plate may be reliably maintained in the temporary coupling position.

While example embodiments have been illustrated and described above, it will be apparent to those skilled in the art that modifications and variations could be made without departing from the scope of the present disclosure as defined by the appended claims.

What is claimed is:

1. A connector assembly comprising:

a first connector having a coupling space formed therein and having a plurality of first terminals disposed in the coupling space;

a moving plate movably installed in the coupling space and having a terminal hole through which the first terminal passes; and a second connector coupled to one side of the first connector and having a holder moving the moving plate in the coupling space, wherein a cam groove is formed in an external surface of the moving plate, and wherein a moving pin, insertable and movable in the cam groove, is formed on the holder, and when the moving plate and the holder are coupled, the moving plate moves in a direction, perpendicular to a coupling direction.

2. The connector assembly of claim 1, wherein the first connector includes a first housing, wherein the first housing has the coupling space therein, wherein the first housing includes a locking portion formed to protrude into the coupling space, and wherein a hook is formed to protrude to one side of the moving plate on the external surface of the moving plate, and the hook is capable of being caught by and fixed to the locking portion.

3. The connector assembly of claim 2, wherein the first housing has at least one first stopper protruding into the coupling space, and wherein the external surface of the moving plate is provided with at least one second stopper positioned to correspond to the first stopper.

4. The connector assembly of claim 3, wherein when the moving plate and the holder are coupled to each other, the moving plate moves in a direction, perpendicular to the coupling direction, by the holder, and blocking by the first stopper and the second stopper is released, and wherein the holder contacts the moving plate to drive the moving plate, whereby the moving plate is moved from a temporary coupling position to a fully coupled position.

5. The connector assembly of claim 1, wherein the cam groove includes an inclined portion at least partially extending obliquely at a predetermined angle with respect to the coupling direction, or an arc-shaped portion curved and extending with a predetermined curvature.

6. The connector assembly of claim 5, wherein the cam groove includes a straight portion continuing from the inclined portion or the arc-shaped portion and extending to one edge of the moving plate, and wherein both ends of the cam groove are open to both sides of the moving plate.

7. The connector assembly of claim 5, wherein the cam groove includes an inclined surface having a varying groove depth within the inclined portion or the arc-shaped portion, and a stopping end formed at an upper end of the inclined surface.

8. The connector assembly of claim 2, wherein the second connector includes, a second housing having an accommodating space therein, a plurality of second terminals inserted into the second housing, and the holder coupled to the second housing in the accommodating space and having a terminal hole through which the second terminal passes, wherein an insertion portion is formed to extend in the coupling direction from one side of the holder, and wherein the insertion portion includes the moving pin formed to protrude from a surface of a free end.

9. The connector assembly of claim 8, wherein an external surface of the first housing is provided with a guide protrusion, and wherein an external surface of the second housing is provided with a guide slit having a predetermined length, for insertion and movement of the guide protrusion.

10. The connector assembly of claim 9, wherein the second housing is provided with a lever installed outside thereof, wherein the lever includes an interlocking plate rotatably installed on the external surface of the second housing and having an interlocking channel, and a handle connected to the interlocking plate, and wherein the interlocking channel and the guide slit cross and communicate with each other, and the guide protrusion is moved in the guide slit along a trajectory of the interlocking channel.

* * * * *